US008290470B2

(12) United States Patent
Ray et al.

(10) Patent No.: US 8,290,470 B2
(45) Date of Patent: Oct. 16, 2012

(54) SYSTEM AND METHOD FOR PROVIDING LOCATION INFORMATION TO A PUBLIC SAFETY ANSWERING POINT DURING AN EMERGENCY 911 CALL FROM A WIFI HANDSET

(75) Inventors: Amar N. Ray, Shawnee, KS (US); Cadathur V. Chakravarthy, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1240 days.

(21) Appl. No.: 11/891,784

(22) Filed: Aug. 13, 2007

(65) Prior Publication Data
US 2009/0047924 A1    Feb. 19, 2009

(51) Int. Cl.
*H04M 11/64* (2006.01)

(52) U.S. Cl. .................. 455/404.2; 455/404.1; 455/415; 455/456.1; 379/37; 379/51

(58) Field of Classification Search ............... 455/404.1, 455/415, 456.1; 370/338; 379/207.15, 142.01, 379/37–51
See application file for complete search history.

(56) References Cited

U.S. PATENT DOCUMENTS

| | | |
|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,937,038 A | 8/1999 | Bell et al. |
| 6,240,285 B1 | 5/2001 | Blum et al. |
| 6,317,049 B1 | 11/2001 | Toubia et al. |
| 6,366,772 B1 | 4/2002 | Arnson |
| 6,415,018 B1 | 7/2002 | Antonucci et al. |
| 6,480,578 B1 | 11/2002 | Allport |
| 6,526,125 B1 | 2/2003 | Lindsay et al. |
| 6,591,112 B1 | 7/2003 | Siccardo et al. |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).
Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

(Continued)

*Primary Examiner* — Jean Gelin
*Assistant Examiner* — Quan M Hua
(74) *Attorney, Agent, or Firm* — Swanson & Bratschun, L.L.C.

(57) ABSTRACT

A system and method for providing location information to a public safety answering point may include receiving, at a network access point, an emergency 911 call signal including GPS location information and mobile directory number of a wireless device. The GPS location information and mobile directory information may be communicated to a selective router associated with a public safety access point servicing an area including the network access point. The network access point may be a WiFi access point. The access point address information may be communicated using a type II caller ID data packet after the public safety answering point goes off-hook. By communicating both the access point address information and GPS location information, both PSAPs that are configured as E911 Phase I and E911 Phase II may display address location information of an emergency 911 caller.

20 Claims, 7 Drawing Sheets

U.S. PATENT DOCUMENTS

| | | | |
|---|---|---|---|
| 6,642,844 B2 | 11/2003 | Montague | |
| 6,678,357 B2 | 1/2004 | Stumer et al. | |
| 6,690,932 B1 | 2/2004 | Barnier et al. | |
| 7,026,925 B2 | 4/2006 | Roche et al. | |
| 7,079,627 B2 | 7/2006 | Crago et al. | |
| 7,095,733 B1 | 8/2006 | Yarlgadda et al. | |
| 7,098,787 B2 | 8/2006 | Miller | |
| 7,231,218 B2 | 6/2007 | Diacakis et al. | |
| 7,269,413 B2 | 9/2007 | Kraft | |
| 7,386,103 B1 | 6/2008 | Chahal | |
| 7,418,087 B2 | 8/2008 | Luneau et al. | |
| 7,496,189 B2 * | 2/2009 | Clarisse et al. | 379/207.15 |
| 7,679,505 B1 | 3/2010 | Vallaire | |
| 7,706,356 B1 | 4/2010 | Olshansky et al. | |
| 7,734,019 B1 | 6/2010 | Terpstra | |
| 7,773,975 B2 | 8/2010 | Snapp et al. | |
| 8,014,341 B1 | 9/2011 | Ray | |
| 8,102,986 B1 | 1/2012 | McClintock et al. | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0016189 A1 | 2/2002 | Sheynblat et al. | |
| 2002/0054667 A1 | 5/2002 | Martinez | |
| 2002/0136363 A1 | 9/2002 | Stumer et al. | |
| 2003/0063714 A1 | 4/2003 | Stumer et al. | |
| 2003/0109245 A1 | 6/2003 | McCalmont et al. | |
| 2003/0133450 A1* | 7/2003 | Baum | 370/389 |
| 2003/0158668 A1 | 8/2003 | Anderson | |
| 2004/0072583 A1 | 4/2004 | Weng | |
| 2004/0176123 A1 | 9/2004 | Chin et al. | |
| 2004/0257273 A1 | 12/2004 | Benco et al. | |
| 2005/0003797 A1 | 1/2005 | Baldwin | |
| 2005/0070315 A1 | 3/2005 | Rai et al. | |
| 2005/0101287 A1 | 5/2005 | Jin et al. | |
| 2005/0111630 A1 | 5/2005 | Potorny et al. | |
| 2005/0123102 A1 | 6/2005 | Beason et al. | |
| 2005/0169248 A1 | 8/2005 | Truesdale et al. | |
| 2005/0201358 A1 | 9/2005 | Nelson et al. | |
| 2005/0209781 A1 | 9/2005 | Anderson | |
| 2005/0265326 A1 | 12/2005 | Laliberte | |
| 2006/0009190 A1 | 1/2006 | Laliberte | |
| 2006/0043164 A1 | 3/2006 | Dowling et al. | |
| 2006/0052134 A1 | 3/2006 | Sato | |
| 2006/0133582 A1 | 6/2006 | McCulloch | |
| 2006/0217136 A1 | 9/2006 | Bantukul et al. | |
| 2006/0219542 A1 | 10/2006 | Savir | |
| 2006/0234727 A1 | 10/2006 | Ashley et al. | |
| 2006/0293024 A1* | 12/2006 | Benco et al. | 455/404.2 |
| 2007/0003024 A1 | 1/2007 | Olivier et al. | |
| 2007/0201391 A1 | 8/2007 | Belmonte et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0018452 A1 | 1/2008 | McCarthy et al. | |
| 2008/0026728 A1 | 1/2008 | Snapp et al. | |
| 2008/0057944 A1 | 3/2008 | Miriyala et al. | |
| 2008/0064363 A1 | 3/2008 | Salafia et al. | |
| 2008/0070546 A1 | 3/2008 | Lee | |
| 2008/0144779 A1 | 6/2008 | Ray et al. | |
| 2008/0200143 A1 | 8/2008 | Qiu et al. | |
| 2008/0273670 A1 | 11/2008 | Dickinson | |
| 2009/0086932 A1 | 4/2009 | Ray | |
| 2009/0097474 A1 | 4/2009 | Ray et al. | |
| 2009/0144260 A1 | 6/2009 | Bennett et al. | |
| 2009/0186596 A1 | 7/2009 | Kaltsukis | |
| 2009/0197567 A1 | 8/2009 | Ogram | |
| 2009/0227225 A1 | 9/2009 | Mitchell et al. | |
| 2009/0310602 A1* | 12/2009 | Olshansky et al. | 370/352 |
| 2010/0002845 A1 | 1/2010 | Zerillo et al. | |
| 2010/0002846 A1 | 1/2010 | Ray et al. | |
| 2010/0003946 A1 | 1/2010 | Ray et al. | |
| 2010/0003947 A1 | 1/2010 | Ray et al. | |
| 2010/0003949 A1 | 1/2010 | Ray et al. | |
| 2010/0003954 A1 | 1/2010 | Ray et al. | |
| 2010/0003955 A1 | 1/2010 | Ray et al. | |
| 2010/0003961 A1 | 1/2010 | Ray et al. | |
| 2010/0098062 A1 | 4/2010 | Croak et al. | |
| 2010/0107192 A1 | 4/2010 | Sennett et al. | |
| 2010/0291894 A1 | 11/2010 | Pipes | |
| 2011/0014923 A1 | 1/2011 | Krco et al. | |

OTHER PUBLICATIONS

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular Ink # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

Non-Final Rejection mailed Jan. 19, 2011 for U.S. Appl. No. 11/430,232.

Non-Final Rejection mailed Mar. 17, 2011 for U.S. Appl. No. 11/640,714.

Non-Final Rejection mailed Mar. 3, 2011 for U.S. Appl. No. 12/257,416.

Non-Final Rejection mailed Mar. 17, 2011 for U.S. Appl. No. 12/257,640.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 12/272,238.

Non-Final Rejection mailed Apr. 1, 2011 for U.S. Appl. No. 12/257,655.

U.S. Appl. No. 11/430,232; Notice of Allowance dated May 13, 2011; 12 pages.

U.S. Appl. No. 11/430,232; Issue Notification dated Aug. 17, 2011; 1 page.

U.S. Appl. No. 11/640,714; Non-Final Rejection dated Sep. 15, 2011; 15 pages.

U.S. Appl. No. 11/640,714; Final Rejection dated Feb. 29, 2012; 17 pages.

U.S. Appl. No. 11/904,883; Non-Final Rejection dated Oct. 7, 2011; 19 pages.

U.S. Appl. No. 11/904,883; Final Rejection dated Apr. 27, 2012; 16 pages.

U.S. Appl. No. 12/257,424; Non-Final Rejection dated Jan. 31, 2012; 21 pages.

U.S. Appl. No. 12/257,424; Final Rejection dated Jul. 14, 2011; 19 pages.

U.S. Appl. No. 11/974,775; Notice of Allowance dated Apr. 27, 2012; 12 pages.

U.S. Appl. No. 11/974,775; Non-Final Rejection dated Nov. 7, 2011; 19 pages.

U.S. Appl. No. 11/974,775; Non-Final Rejection dated May 10, 2011; 24 pages.

U.S. Appl. No. 12/168,668; Non-Final Rejection dated Feb. 6, 2012; 21 pages.

U.S. Appl. No. 12/070,909; Final Rejection dated Jan. 10, 2012; 9 pages.

U.S. Appl. No. 12/070,909; Non-Final Rejection dated Aug. 16, 2011; 13 pages.

U.S. Appl. No. 12/257,574; Final Rejection dated Dec. 29, 2011; 18 pages.

U.S. Appl. No. 12/257,574; Non-Final Rejection dated Jul. 6, 2011; 20 pages.

U.S. Appl. No. 12/257,624; Final Rejection dated Jan. 31, 2012; 14 pages.

U.S. Appl. No. 12/257,624; Non-Final Rejection dated Oct. 6, 2011; 19 pages.

U.S. Appl. No. 12/257,641; Notice of Allowance dated Feb. 2, 2012; 12 pages.

U.S. Appl. No. 12/257,641; Non-Final Rejection dated May 24, 2011; 17 pages.

U.S. Appl. No. 12/257,928; Non-Final Rejection dated Jun. 8, 2011; 21 pages.
U.S. Appl. No. 12/257,862; Final Rejection dated Nov. 30, 2011; 15 pages.
U.S. Appl. No. 12/257,862; Non-Final Rejection dated May 24, 2011; 19 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 11/974,775; Notice of Allowance dated Jun. 12, 2012; 15 pages.
U.S. Appl. No. 12/257,424; Final Rejection dated Jun. 13, 2012; 41 pages.
U.S. Appl. No. 12/272,238; Notice of Allowance dated Jun. 8, 2012; 21 pages.

* cited by examiner

PSAP Screen Display Format

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | | | | CALL | | BACK | | NUMBER | | | | | | | | | | TIME | HRS: | MIN | | | | | | | MONTH/DATE | | | | |
| 1 | ( | 9 | 1 | 3 | ) | 5 | 5 | 5 | - | 1 | 2 | 3 | 4 | | | | | 1 | 9 | : | 5 | 4 | | | | | 1 | 1 | / | 2 | 5 |
| 2 | S | T | R | E | E | T | # | | | | | | | S | T | R | E | E | T | | N | A | M | E | | | | | | | |
| 3 | C | O | M | M | U | N | I | T | Y | | N | A | M | E | | | | | | | S | T | | E | S | N | | W | P | H | 2 |
| 4 | W | I | R | E | L | E | S | S | | S | P | + | 2 | 4 | X | 7 | C | O | N | T | A | C | T | | N | U | M | B | E | R | |
| 5 | | | | | | | | | | | | | | | | | | | | | | | | | | | | | | | | |
| 6 | | P | H | A | S | E | - | I | I | | M | A | P | | I | D | | | p | A | N | I | | E | S | R | K | / | | E | S | R | D |
| 7 | | | | | | | | | | | | | | | | | | | | | | | | | | | | | | | | |
| 8 | | | | | | | | | | | | | | | | | | | | | | | | | | | | | | | | |
| 9 | | | | | | | | | | | | | | | | | | | | | | | | | | | | | | | | |
| 10 | | | | | | | | | | | | | | | | | | | | | | | | | | | | | | | | |
| 11 | P | R | I | M | A | R | Y | | W | I | R | E | L | E | S | S | | | P | S | A | P | | T | O | | W | H | I | C | H | |
| 12 | C | A | L | L | | W | A | S | | | | | | | | | | | | | | | | | | | | | | | | |
| 13 | R | O | U | T | E | D | | | | | | | | | | | | | | | | | | | | | | | | | | |
| 14 | L | A | T | +/- | L | A | T | I | T | U | D | E | | | | | | | | L | O | N | | +/- | L | O | N | G | I | T | U | D | E |
| 15 | M | E | T | E | R | S | | | | | | | | | | | | | | | | | P | E | R | C | E | N | T | | | | |

*FIG. 5*

SYSTEM AND METHOD FOR PROVIDING LOCATION INFORMATION TO A PUBLIC SAFETY ANSWERING POINT DURING AN EMERGENCY 911 CALL FROM A WIFI HANDSET

BACKGROUND

The National Telecommunications Information Administration (NTIA) is the executive branch's advisory agency on telecommunications issues. In the early 1980s, this agency proposed a plan to raise awareness of a single emergency telephone number to the general public. From that program, the National Emergency Number Association (NENA), a non-profit organization, was created. NENA has since become a leading organization to improving technology and developing guidelines for 9-1-1 ("911") telephone calls (i.e., emergency telephone calls) to improve response by emergency rescue teams.

Telecommunications has been changing rapidly over the past several years, primarily since the development and growth of the mobile telephone industry and the Internet. New forms of telecommunications have been developing as well. Traditional telecommunications were performed over the public switch telephone network (PSTN). A system to maintain location of subscribers of telecommunications companies operating on the PSTN was developed. Determining the location of subscribers of the telecommunications companies was relatively easy as the locations of telephones were known by the telecommunications companies or carriers due to installing the telephones, establishing billing, or otherwise. However, with the new forms of telecommunications, subscribers are able to use wireless devices that may access different wireless access points to communicate over a communications network such as the Internet. One common interface for wireless access to a communications network includes an IEEE 802.11 communications protocol, which is commonly known by the brand name WiFi. Wireless devices are being configured to have WiFi communications protocols to enable a subscriber to access WiFi enabled access points. Many WiFi enabled wireless devices have global positioning system (GPS) capabilities that are able to communicate GPS location information (i.e., latitude and longitude coordinates) of the WiFi enabled device. While GPS location information may be helpful to track or locate a person at a precise geographical location, such information is not extremely useful in an emergency situation where emergency rescue teams, such as firemen and police, better understand address information for performing an emergency rescue in an emergency situation.

A public safety answering position (PSAP) is used by emergency services to answer calls from the public to notify emergency personnel, such as police or firemen, to respond to an emergency situation. Traditionally, a caller would contact a PSAP and provide location information during the telephone call. When caller identification (i.e., caller ID) was introduced, PSAPs were installed with telephone systems compatible with caller ID to identify names and phone numbers of individuals placing emergency 911 calls. This first version of caller ID is known as type I caller ID. Type I caller ID operates in a single data message format (SDMF) as well as multiple data message format (MDMF) that provide a caller's telephone number, date and time of the call during the ringing interval.

A second type of caller ID or type II caller ID was later developed to communicate name and address information of a second calling party to a called party when a call between a called party and a first calling party is in progress. Type II caller ID uses a multiple data message format (MDMF) that communicates a caller's name, telephone number, date and time. Enhanced 911 is a North American Telephone Network (NATN) feature of the 911-emergency-calling system that uses a reverse telephone directory provided by cellular telephone companies to determine location information of a caller.

There are two types of E911 systems that operate within the United States, Phase I and Phase II. E911 Phase I systems are required to provide an operator with the telephone number, originator, and location of the cell site or base station receiving a 911 call. E911 Phase II systems are required to use an automatic location identification (ALI). However, only 18% of all PSAPs are configured with E911 Phase II systems. The remaining 82% of PSAPs are configured with E911 Phase I systems, which are incapable of handling GPS coordinates, and, therefore, subscribers who have wireless telephones that use GPS coordinates for 911 emergency calls cannot be properly serviced by these PSAPs. If a caller is using a non-cellular wireless device, such as a WiFi enabled wireless device, an operator at a PSAP with E911 Phase I capabilities is unable to determine address location based on GPS coordinates that are received from the caller. And, because WiFi enabled wireless devices do not communicate via a cellular network, there is no cell site or base station location information to be communicated to the PSAP.

SUMMARY

To overcome the problem of PSAPs with E911 Phase I capabilities not being able to translate GPS coordinates into address location information for non-cellular wireless devices, the principles of the present invention provide for address information of a WiFi access point over which a WiFi enabled wireless device is communicating to be communicated to a PSAP via a Type II caller ID data packet in addition to communicating GPS coordinate information. By providing both address information of the WiFi access point and GPS information, PSAPs, whether configured as E911 Phase I or Phase II, provide an operator at the PSAP with location information of a caller using a WiFi enabled wireless device that accesses a communications network via a network access point, such as a WiFi access point.

One embodiment of a system for providing location information to a public-safety answering point during an Emergency 911 call may include a WiFi access point configured to receive calls from WiFi enabled wireless devices. A controller may be in communication with the WiFi access point and be configured to receive information from the WiFi access point for 911 call. The information may include information associated with a wireless WiFi device, such as mobile directory number, GPS information, and port ID, for example. A database may be in communication with the controller, where the database includes network address information of selective routers associated with public safety answering points. A gateway may be in communication with the database and in communication with a network on which the selective routers are operating. The controller may be configured to request selective router information, from the database, of a selective router to which information is to be sent via the gateway to a public safety answering point servicing an area including the WiFi access point during an emergency 911 call.

An embodiment of a method for providing location information to a public safety answering point may include receiving, at a network access point, an emergency 911 call signal including GPS location information and mobile directory number of a wireless WiFi device. The GPS location information, mobile directory information, and access point address location information may be communicated to a public safety answering point (PSAP) through a selective router servicing an area including the network access point. The access point address location information may be communicated after the public safety answering point goes off-hook and may be communicated within a type II caller ID formatted data packet. The network access point may be a WiFi access point. By communicating the access point address location information and GPS location information, PSAPs that are configured as E911 Phase I and E911 Phase II may both display address location information of an emergency 911 caller. If the PSAP is not compatible with type II caller ID then a type II caller ID device (e.g., an adjunct) may be connected at the PSAP to receive and display the access point address location information.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 5 is a screen shot of an exemplary screen display format at a public safety answering point;

DETAILED DESCRIPTION OF DRAWINGS

Figure 1:
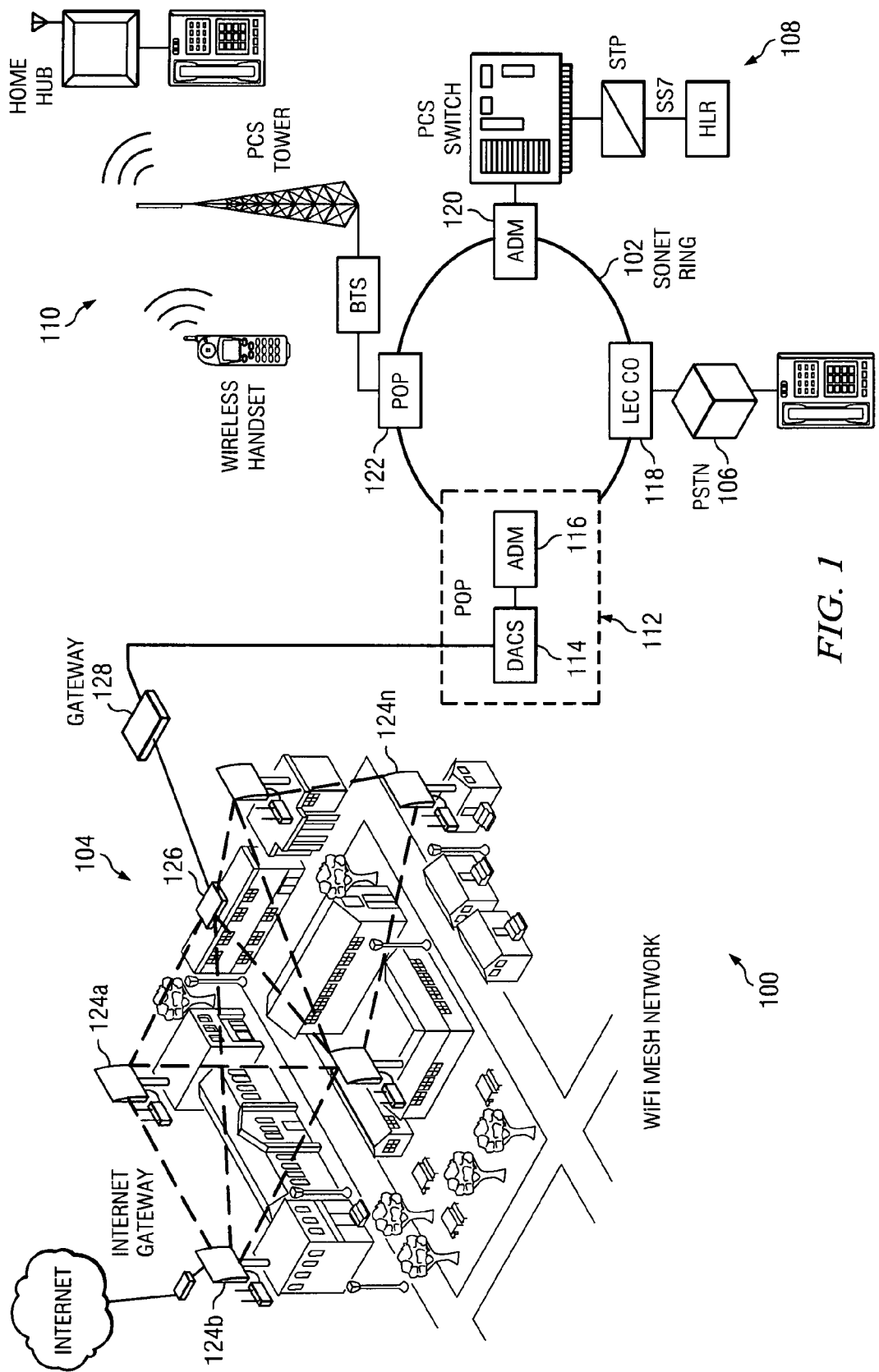
FIG. 1 is an illustration of multiple exemplary networks operating on a synchronous optical network.

FIG. 1 is an illustration of multiple exemplary networks 100 operating on a synchronous optical network ("SONET") 102. The networks 100 include a WiFi mesh network 104, public switched telephone network (PSTN) 106, personal communications service or mobile network 108, and wireless network 110. The WiFi mesh network 104 accesses the SONET ring 102 via a point-of-presence (POP) 112 that may include a digital access cross-connect system (DACS) 114 and add drop multiplexer (ADM) 116. The PSTN 106 may access the SONET ring 102 via a local exchange carrier central office 118. The mobile network 108 may access the SONET ring 102 via an add drop multiplexer 120. The wireless network 110 may access the SONET ring 102 via a POP 122.

The WiFi mesh network 104 includes WiFi access points 124a-124n (collectively 124) that enable subscribers using WiFi enabled wireless devices to access the WiFi mesh network 104. As understood in the art, the WiFi access points 124 are configured to communicate with each other, and a controller 126 is configured to control communications on the WiFi mesh network 104. Each WiFi access point 124 registers with the controller 126 so that the controller knows when communications signals are being received from a particular WiFi access point. If the controller 126 determines that communications signals being received from a WiFi access point are to be communicated to another network, such as the PSTN 106, then the controller 126 communicates with a gateway 128. The gateway 128 operates as an interpreter between networks to translate between time division multiplexed signaling, which is one of the signaling formats of the SONET ring 102, and VoIP signals that are communicated on the WiFi mesh network 104. It should be understood that the gateway 128 may interpret between other communications protocols. It should further be understood that although a WiFi mesh network 104 is shown, such a wireless network is exemplary and that the principles of the present invention may be applied to other communications protocols, currently existing or developed in the future.

Because WiFi wireless devices communicate via different WiFi access points while moving within a WiFi mesh network address information of WiFi enabled wireless devices and WiFi access points 124 have not been available to PSAPs. PSAPs with E911 Phase II capabilities can determine address location through the use of GPS coordinates, but PSAPs with E911 Phase I capabilities cannot determine location of either a WiFi enabled wireless device or WiFi access point. The principles of the present invention provide the PSAP with the address location of the access point to which a wireless WiFi device is connected when the PSAP goes off-hook to answer a 911 call.

Figure 2:
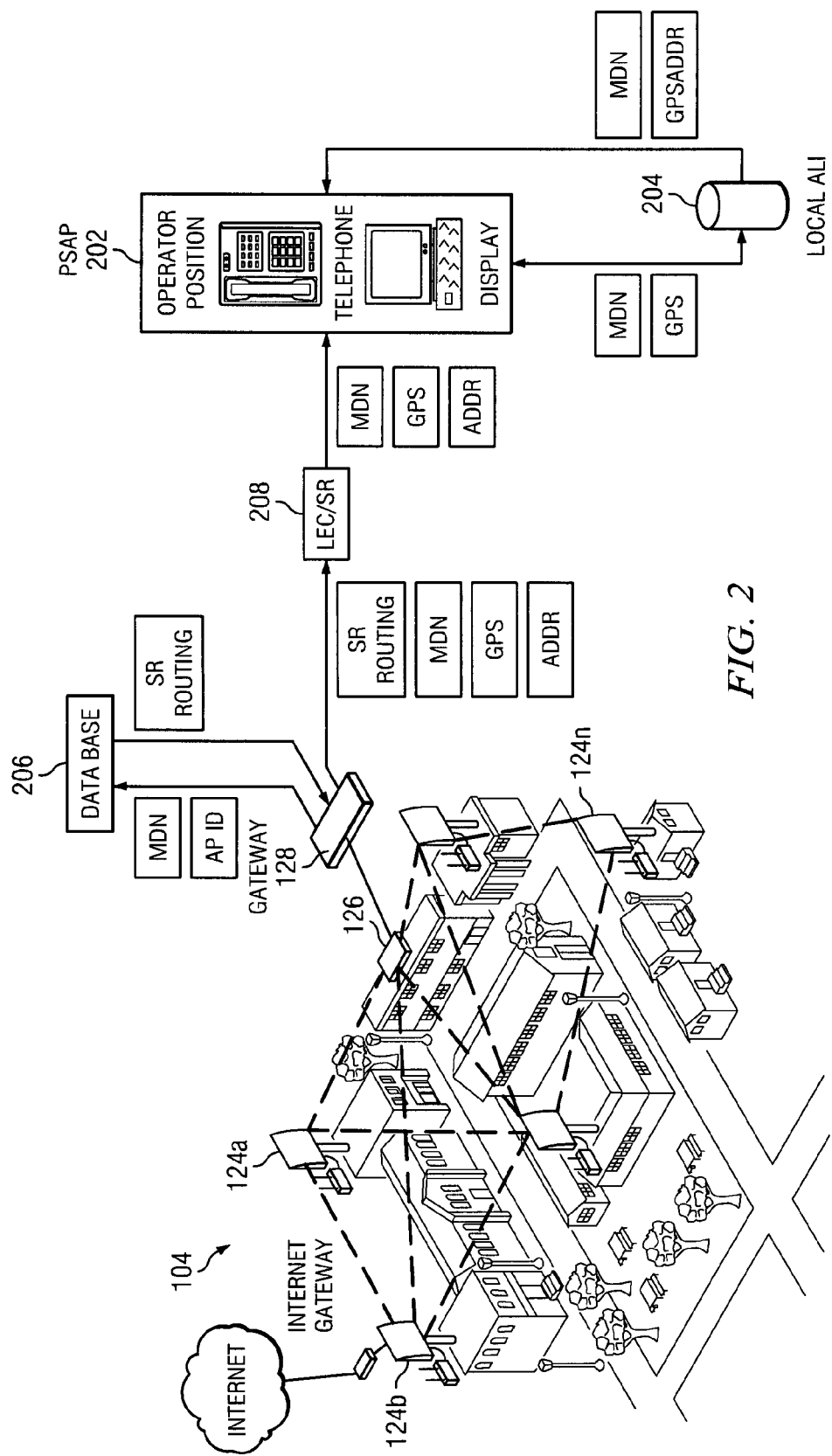
FIG. 2 is an illustration of a WiFi mesh network in communication with a public safety answering point.

FIG. 2 is an illustration of a WiFi mesh network 104 in communication with a public safety answering point (PSAP) 202. As shown, PSAP 202 is in communication with a local automated location identifier (ALI) 204 that is capable of supporting PSAP 202 for determining an address based on GPS coordinates. However, while the PSAP 202 can perform a conversion for an address location of a WiFi enabled wireless device that communicates GPS coordinates, if the PSAP is not E911 Phase II enabled, then the PSAP 202 can not do the address conversion, but can provide MDN information.

The PSTN includes many selective routers that are associated with thousands of PSAPs in the United States. Because there are so many selective routers and PSAPs located on the PSTN, the gateway 128 has to determine which selective router to send the information associated with an emergency 911 call. A database 206, with which the gateway 128 communicates, includes address information of selective routers associated with PSAPs servicing an area in which the WiFi access point is located, so that a gateway 128, in response to receiving an emergency 911 call, can route information to the correct PSAP to handle the emergency 911 call. More specifically, when an emergency 911 call is received from a WiFi enabled wireless device that is GPS enabled, a mobile directory number (MDN and GPS coordinates are communicated via the WiFi access point, such as WiFi access point 124a, and the controller 126 to the gateway 128. The gateway 128, in response to determining that the call is an emergency 911 call, may send the mobile directory number and WiFi access point identification information, which was previously registered with the controller 126, to the database 206. The database 206 looks up a selective router associated with a PSAP servicing the area in which the WiFi access point that received the emergency 911 call is operating and communicates the routing data to the gateway 128. The gateway 128 communicates the routing data, MDN, and GPS information, and WiFi access point address information to the selective router 208 looked up in the database 206. The selective router 208 may perform another look-up at a local or remote database (not shown) for determining the correct PSAP that is servicing the WiFi access point through which the emergency 911 call was initially received or is now handling the WiFi enabled wireless device. The selective router 208 may communicate the MDN, GPS information, and address information to the PSAP 202. The MDN, GPS information, and, optionally, port ID, may be sent in response to the emergency 911 call being placed. The address information may be sent after the PSAP 202 goes off-hook (i.e., an operator at the PSAP answers the call). In one embodiment, the address is sent using a caller ID type II data packet, as further described herein. The PSAP 202, in turn, converts address location information with the help of local ALI 204 associated with the GPS coordinates. The MDN and the GPS information are communicated to the PSAP 202 from the local ALI 204. In one embodiment, the MDN and GPS (latitude and longitudinal coordinates) information are communicated from the local ALI 204 to the PSAP 202 in a table format.

After the PSAP goes off-hook to answer the call for communicating the address information of the WiFi access point via the gateway 128 to the PSAP 202, a type II caller ID signal format may be utilized. Further description of the caller ID signal format is provided in FIG. 4.

Each of the WiFi access points 124 may initially be configured with location information that identifies a location of each of the respective WiFi access points 124. The address information may be specific to street address, building number, floor number, apartment number, suite number, gate number at an airport terminal, or any other address identifier that can provide an emergency service worker location information of a person who is using a WiFi enabled wireless device for communicating with a WiFi access point during an emergency 911 call. Establishing the address within the WiFi access point may be performed during initialization, reset, or at any other time either directly at the WiFi access point or remotely from another device. The address information, in addition to the MDN, and GPS information, may be communicated to the PSAP 202. It should be noted that the MDN and GPS information may be communicated to the PSAP 202 while the PSAP is in the on-hook mode, whereas the address information is communicated to the PSAP 202 after the PSAP goes to the off-hook mode to answer a call. By providing the address information that identifies an address location of the WiFi access point to the PSAP 202, address location information may be displayed through a caller ID type II device that is indicative of the address of the WiFi access point with which a 911 caller using a WiFi enabled wireless device is connected. The address location information, in the caller ID type II format, of the WiFi access device may be displayed through a type II caller ID device for both E911 Phase I or Phase II configured PSAPs.

Figure 3A:
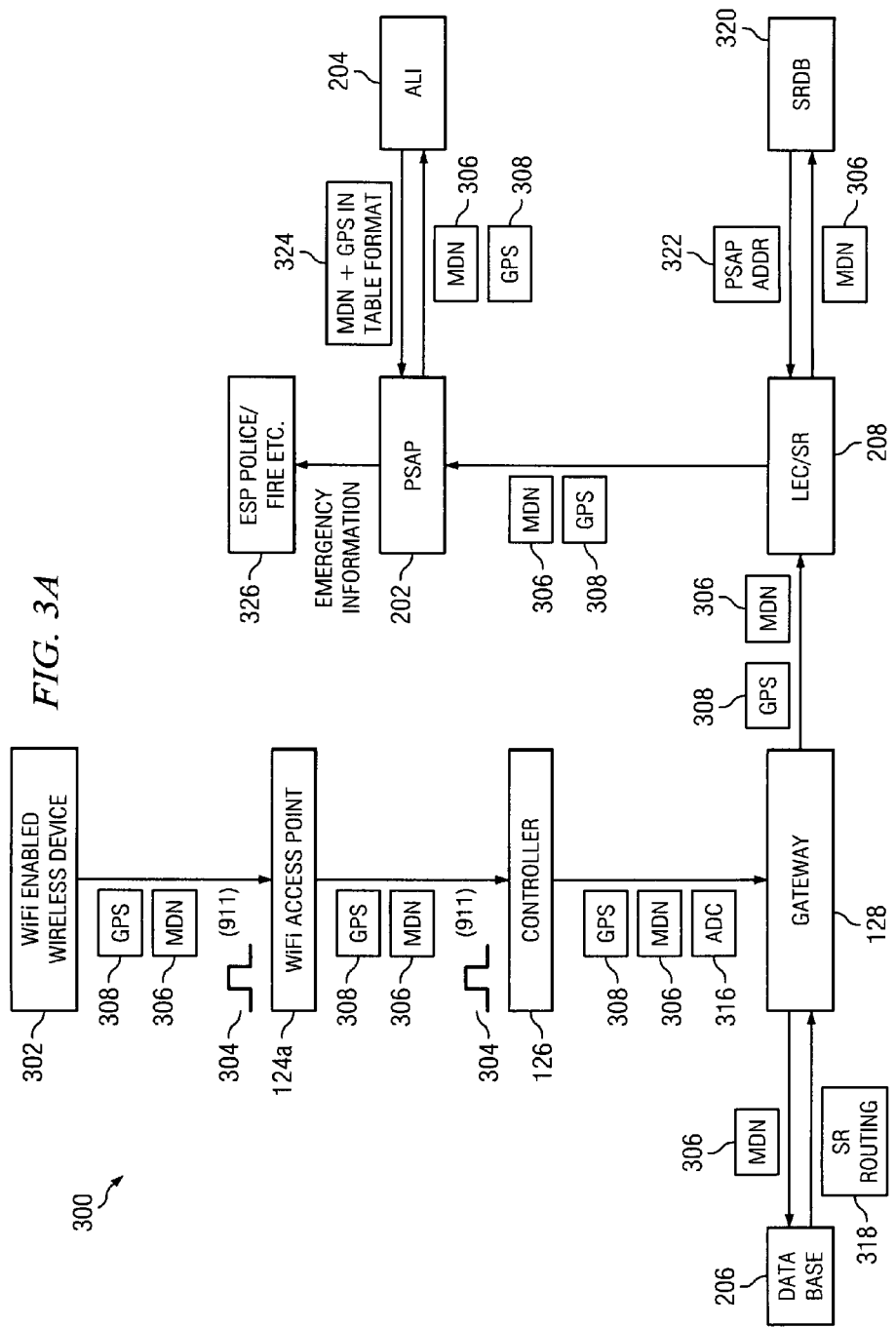
FIG. 3A is a block diagram showing exemplary information communicated from a WiFi enabled wireless device to establish a call with a public safety answering point.

FIG. 3A is a block diagram that shows a process 300 for connecting to a PSAP after a 911 call is initiated. The process 300 also shows exemplary information communicated from a WiFi enabled wireless device 302 may be configured with a GPS apparatus (not shown) to receive and generate GPS coordinates for use in locating a position of the WiFi enabled wireless device 302. Although shown as a WiFi enabled wireless device 302, the principles of the present invention may use other wireless devices capable of communicating with network access points other than cellular telephone networks.

The WiFi enabled wireless device 302, in response to a user dialing "911," may communicate dual-tone multiple frequency (DTMF) signals 304 to call an emergency service provider, such as police or firemen. In addition to the DTMF signals 304, mobile directory number 306 and GPS information 308 may be communicated from the WiFi enabled wireless device 302 to WiFi access point 124a while establishing the call with the PSAP (i.e., while a communication device at the PSAP is on-hook). The WiFi access point 124a may be configured with address location information of a present location of the WiFi access point 124a. The address location information may be configured in any manner and have any address location specific to the location of the WiFi access point 124a, such as building, floor, location on a floor, or otherwise.

The WiFi access point 124a may communicate the DTMF signals 304, mobile directory number 306, and GPS information 308 to controller 126. If the WiFi enabled wireless device 302 is not GPS enabled, then GPS information 308 is not communicated. The controller, in response to determining that the call is an emergency 911 call, generates an abbreviated dialing code (ADC) 316 to indicate that the call is an emergency 911 call. The mobile directory number 306 and GPS information 308 may be communicated to the gateway 128.

The gateway 128, in response to determining that a call is an emergency 911 call, communicates the mobile directory number 306 to database 206 for looking up selective router routing information 318 to route the mobile directory number 306 and GPS information 308 to a PSAP 202 that is servicing an area that the WiFi access point 124a is located. The gateway 128 communicates or routes the mobile directory number 306 and GPS information 308 to the appropriate local exchange carrier selective router 208. The selective router 208, communicates the mobile directory number 306 and GPS information 308 to a selective router database 320, which looks up a PSAP address 322 that is servicing the location of the access point 124a. The selective router 208 routes the mobile directory number 306 and GPS information 308 to the PSAP 202 at the PSAP address 322.

The PSAP 202 uses the GPS information 308 to perform a conversion to determine an address location associated with the GPS information 308 generated by the WiFi enabled wireless device 302. The PSAP 202 may receive the mobile directory number 306 and the GPS information 308 in a table format 324 for display on a screen.

Figure 3B:
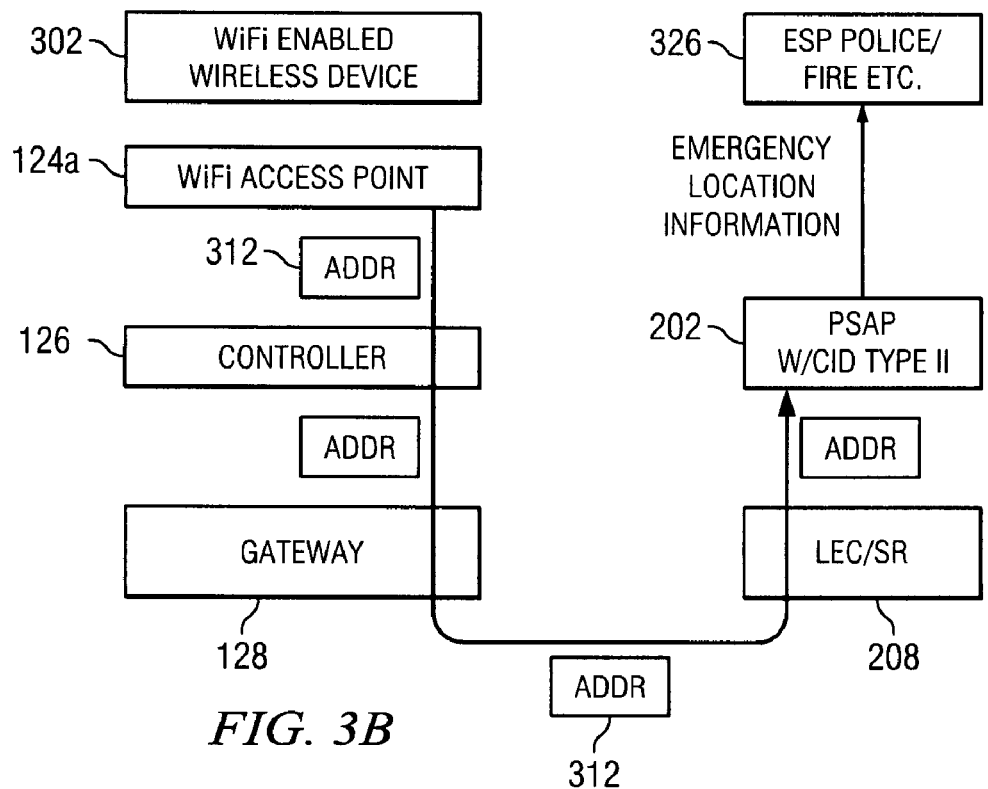
FIG. 3B is a block diagram showing exemplary address information communicated from a WiFi access point device to a public safety answering point.
Figure 4:
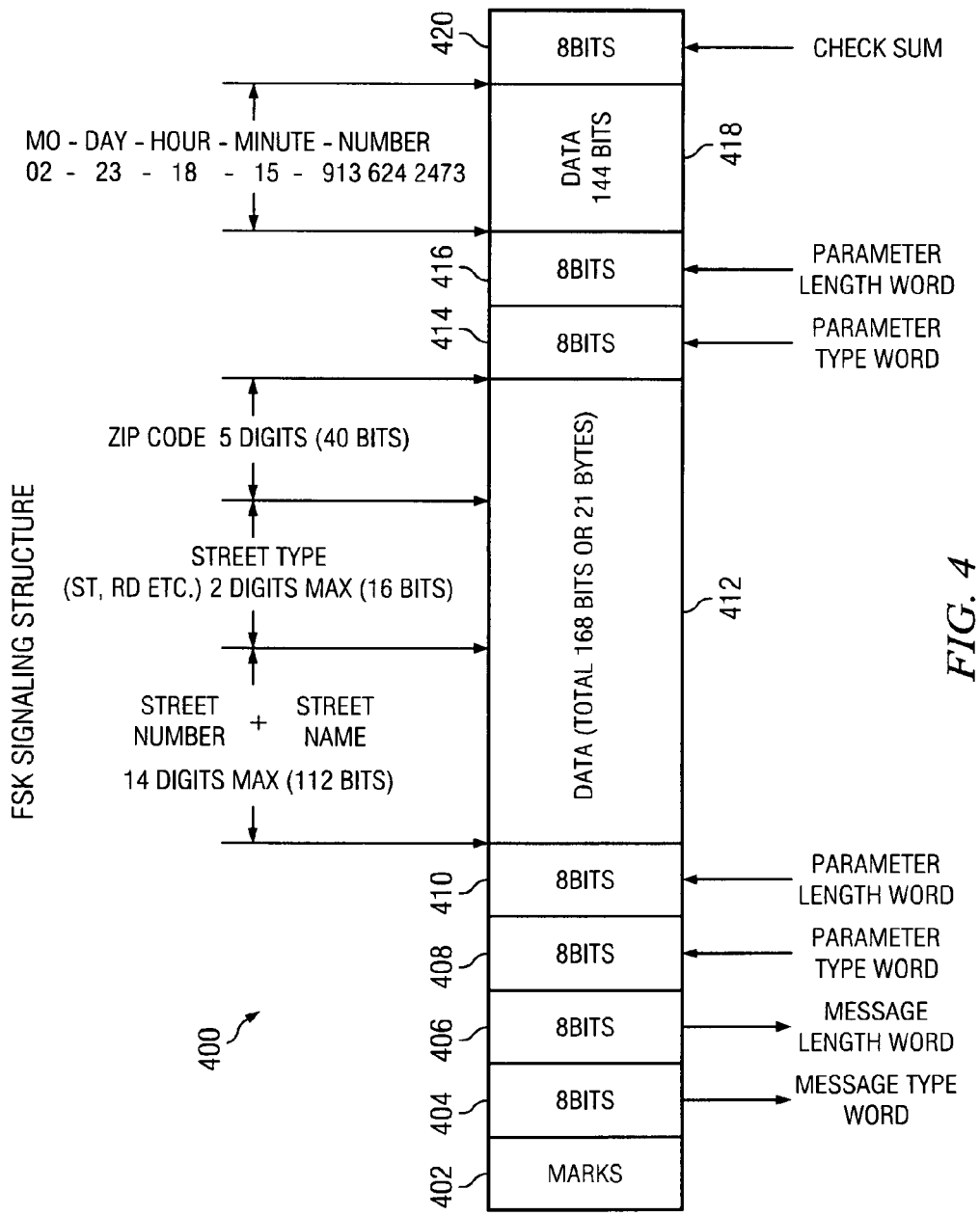
FIG. 4 is a block diagram of an exemplary signaling structure for communicating address information of a WiFi access point in a Type II caller ID data packet.

FIG. 3B is a block diagram that shows a process for sending address based location information 312 after the PSAP goes off-hook to answer the 911 call. After the 911 call is established (i.e., a communication device at the PSAP goes off-hook to answer the 911 call), the WiFi access point 124a sends the address information 312 to the PSAP 202 via the controller 126, the gateway 128, and the selective router 208. The address location information 312 may be stored and/or communicated as type II caller ID data packet (FIGS. 3B and 4). In addition, the PSAP 202 may be configured to display address information 312 that is stored by the WiFi access point 124a. In one embodiment, the PSAP uses a type II caller ID device to display the address information of the WiFi access point 124a. By being able to display address information 312 that is stored by the WiFi access point 124a, or otherwise looked up in a database, and address information determined by the PSAP, an operator at the PSAP 202 may have enough information to notify emergency service personnel 326 as to location of a possible victim placing an emergency 911 call. If the PSAP 202 is configured as an E911 Phase I PSAP, then address information 312 that identifies the address location of the WiFi access point 124a is displayed, but address information associated with GPS information 308 that identifies the location of the WiFi enabled wireless device 302 cannot be displayed because the PSAP is not upgraded to Phase II.

FIG. 4 is a block diagram of an exemplary signaling structure for communicating address information in a type II caller ID data packet. The signaling structure format 400 may be the same or substantially the same signaling structure as a conventional caller ID type II signaling structure as understood in the art. The signaling structure 400 includes a number of fields, including marks 402, message type 404, message length 406, parameter type 408, parameter length 410, data 412, parameter type 414, parameter length 416, data 418 and check sum 420. Although the signaling structure 400 is configured for caller ID information, such as name and telephone number to be included in data fields 412 and 418, which are 168 bits (21 characters) and 144 bits (18 characters), respectively, the principles of the present invention provide for including street number and street name (14 characters—112 bits), street type (2 characters—16 bits), and zip code (5 characters—40 bits) in the first data field 412 and date, time and phone number in the second data field 418. This FSK signaling structure 400 may be generated by a WiFi access point and the address information stored in the first data field 412 may be stored during initialization or set up of the WiFi access point locally or remotely.

More specifically, the address parameter may be ASCII equivalent of the characters that represent the address associated with the calling access line. The character subfields may be coded in 8 bit ASCII (no parity) with one octet per character. No characters (e.g., spaces, commas, periods, etc.) are assumed and the relevant characters are sent. The first character of the address may be transmitted first and subsequent characters may be transmitted in order until the last character is transmitted. For example, the address "12345John Rd" may be coded over 12 octets as 00110001, 00110010, 00110011, 00110100, 00110101, 01001010, 01001111, 01001000, 01001110, 00100000 (space), 01010010, and 01000100. If the street number plus the street name combined is more than 14 characters, then the characters after 14 characters are ignored by the system. If the street number plus the street name combined occupies 11 characters then one space may be put before the street name, one space before the street type, and another space before the street code. If the street number plus the street name combined occupies 12 characters, then one space may be put before the street name and another space may be put before the zip code. If the street number plus the street name combined occupies 13 characters, then one space may be put before the street name. To minimize the total length of the displayed address message on the public-safety answering point side, no more than one space is put before the street name, street type, or zip code. If the street number plus the street name combined occupies 14 characters, then no spaces are included. Additional description of the signaling structure format 400 and communication thereof is described in co-pending patent application having Ser. No. 11/430,232 filed May 8, 2006, which is incorporated herein by reference in its entirety.

FIG. 5 is a screen shot of an exemplary screen display format 500 at a public safety answering point. The information displayed in the PSAP screen display 500 may include information provided by the ALI database (FIG. 3). The screen may include call back number 502, time 504, date 506, and location information 508, if provided, by the ALI. In addition, GPS longitude and latitude information 510 may be displayed on the PSAP screen display format 500. Address information communicated in a type II caller ID data packet may be displayed on a separate caller ID device, such as the caller ID device 600 shown in FIG. 6.

Figure 6:
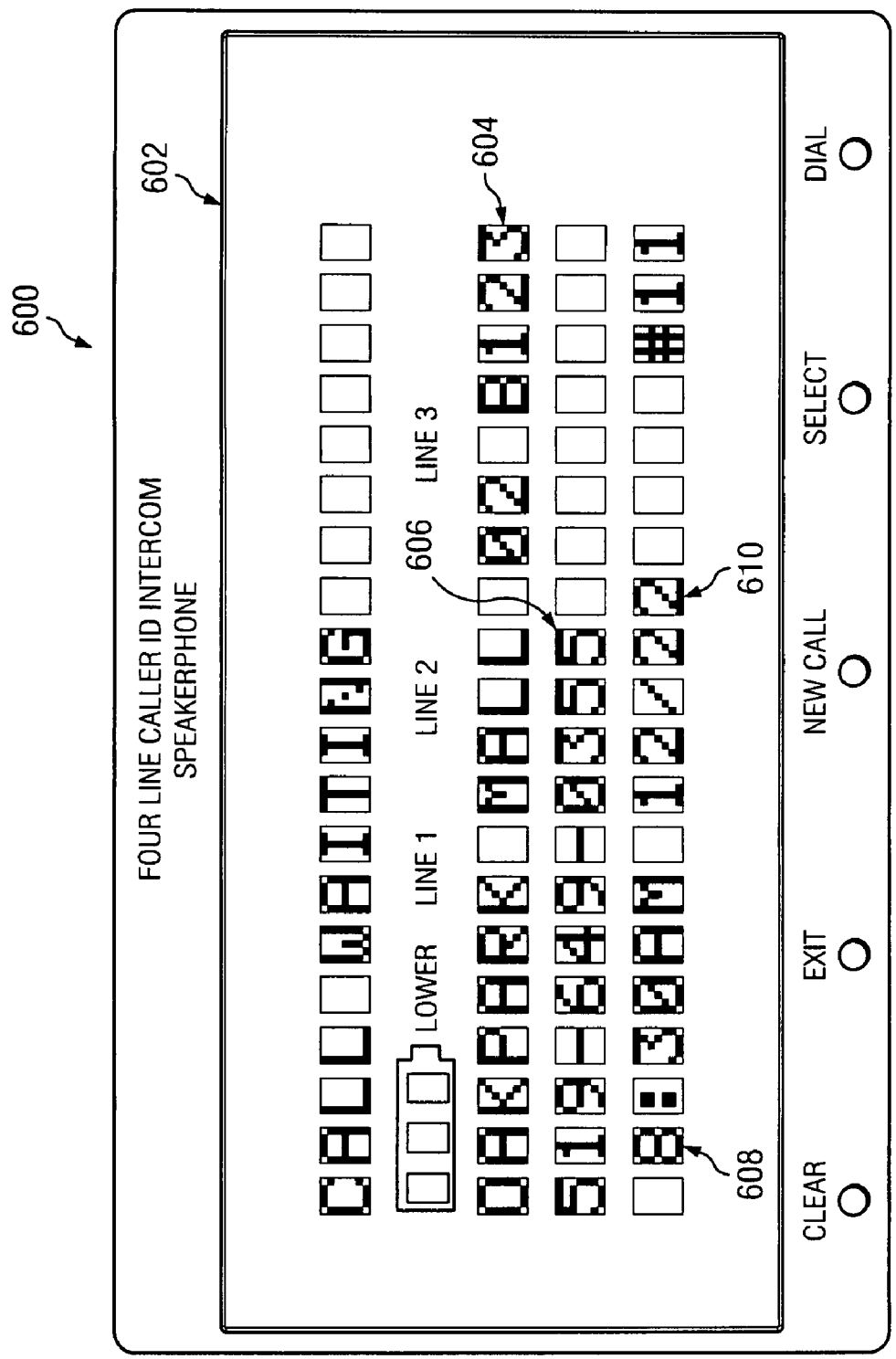
FIG. 6 is a screen shot showing exemplary address information communicated in a caller ID data packet.

FIG. 6 is a screen shot 600 showing exemplary address information communicated in a caller ID type II data packet. As shown, the caller ID device 600 includes a display 602 that is displaying an address 604, caller ID telephone number 606, time 608, and date 610. It should be understood that any information that may be communicated in a type II caller ID data packet may be displayed on the caller ID device 600 that is configured to receive information communicated in a type II caller ID data packet.

Figure 7:
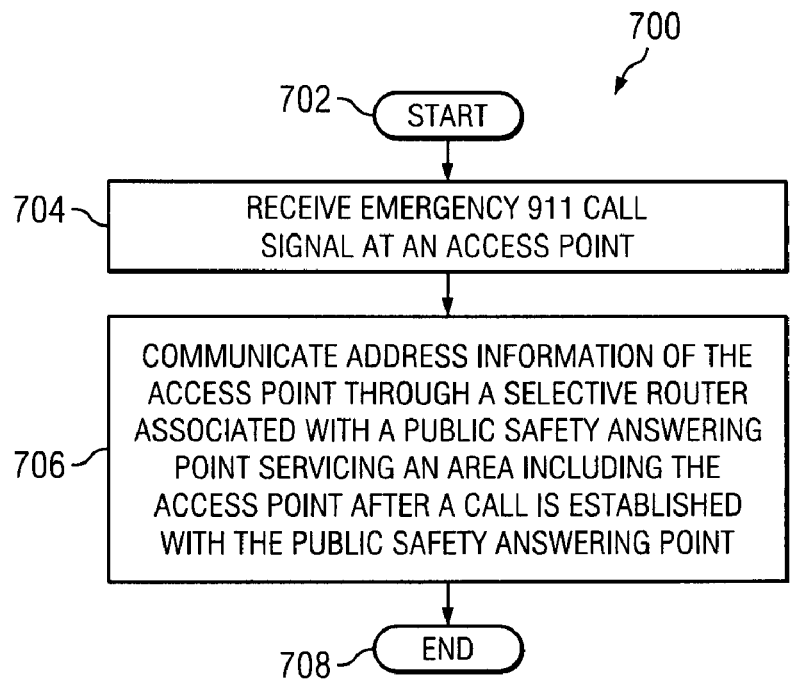
FIG. 7 is a flow diagram of an exemplary process for communicating address information of a WiFi access point to a public safety answering point.

FIG. 7 is a flow diagram of an exemplary process 700 for communicating address information of a WiFi access point to a public safety answering point. The address communication process starts at step 702. At step 704, an emergency 911 call signal is received at an access point, such as a WiFi access point. The access point may be a WiFi access point that receives an emergency 911 call from a WiFi enabled wireless device. At step 706, address information of the access point is communicated through a selective router associated with a public safety answering point servicing an area including the access point after the 911 call is established. The selective router may be associated with the public safety answering point by being in a local region or within the same network. The address information may be address information stored at the access point or elsewhere. One or more databases may be utilized to look up routing information of a selective router associated with the public safety answering point that is servicing the area including the access point at which the call was initially received. The process ends at step 708. Although one embodiment has been described as a WiFi access point, any other communication protocol may utilize the principles of the present invention.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for providing location information to a public-safety answering point during an Emergency 911 call, said system comprising:
  a WiFi access point configured to:
    store WiFi access point physical address information;
    in response to receiving an emergency call from a WiFi enabled wireless device, generate a modified caller identification frequency shift keying (CIFSK) signal containing said physical address information of the Wifi access point, wherein said generating comprises:
      retrieving the stored physical address information; and
      modifying the CIFSK signal by replacing data in the call identification information data fields with the retrieved physical address information, said physical address information comprising street number and name; and
    transmit the generated CIFSK signal to a controller;
  the controller in communication with said WiFi access point and configured to:
    receive information associated with the WiFi enabled wireless device from said WiFi access point in said CIFSK signal; and
    communicate an identifier of the WiFi enabled wireless device and WiFi access point identification information, and the WiFi access point physical address information to a gateway;
  a database in communication with said controller, said database including network address information of selective routers through which information is communicated to public safety answering points, and configured to:

identify, in response to receiving a selective router request, a selective router; and
communicate selective router information of the identified selective router in response to the request; and
a gateway in communication with said database and in communication with a network on which the selective routers are operating,
said controller being configured to request selective router information, from said database, of a selective router through which information is to be sent to a public safety answering point servicing an area including said WiFi access point during an emergency 911 call by communicating the WiFi access point identification information to said database;
said gateway further being configured to receive the selective router information and communicate the emergency 911 call including the WiFi access point physical address to the selective router identified by said database, to cause the public safety answering point receiving the emergency 911 call to display the physical address.

2. The system according to claim 1, wherein said WiFi access point is configured to receive GPS location information and mobile directory number from the WiFi enabled wireless device during the emergency 911 call.

3. The system according to claim 2, wherein said WiFi access point is configured to communicate the mobile directory number, GPS location information, WiFi access point physical address information, and port ID information of said WiFi access point to said controller during the emergency 911 call.

4. The system according to claim 3, wherein said WiFi enabled wireless device is a phone.

5. The system according to claim 1, wherein said WiFi access point is configured to generate a caller identification frequency shift keying signal including a type II caller ID data packet that includes the physical address information of said WiFi access point.

6. The system according to claim 5, wherein the public safety answering point is E911 Phase I compliant and displays the physical address information of said WiFi access point using caller ID.

7. The system according to claim 5, wherein the public safety answering point is E911 Phase II and displays the physical address location of said WiFi access point and address location of the WiFi enabled wireless device based on the GPS location information.

8. A method for providing location information to a public safety answering point, said method comprising:
storing, at a network access point, location information comprising physical address of said network access point;
receiving, at the network access point, an emergency 911 call signal from a wireless device, said emergency 911 call signal including GPS location information, mobile directory number of a wireless device and;
in response to said receiving, communicating, by the network access point, the emergency 911 call signal including the GPS location information, mobile directory number of the wireless device, and the network access point physical address to a network gateway in communication with a database and in communication with a network on which selective routers are operating, said communicating comprising:
generating a modified caller identification frequency shift keying (CIFSK) signal; and
retrieving the stored physical address information;
modifying the CIFSK signal by replacing data in the call identification information data fields with the retrieved physical address information, said physical address information comprising street number and name;
transmitting the generated CIFSK signal to a gateway;
determining at said database a destination selective router to which the call signal is destined;
at the gateway, receiving the determined selective router information from the database and communicating the GPS location information, the mobile directory information, and the network access point physical address to the selective router associated with a public safety answering point servicing an area including the network access point to cause the public safety answering point receiving the emergency 911 call signal to display the physical address.

9. The method according to claim 8, further comprising looking up selective router information associated with the selective router and communicating the GPS location information, mobile directory number, and network access point physical address information via the selective router to the public safety answering point using caller ID.

10. The method according to claim 8, wherein communicating includes generating a caller identification frequency shift keying signal with a caller ID type II data packet that includes the network access point location information.

11. The method according to claim 8, wherein receiving the emergency 911 call signal includes receiving a WiFi signal.

12. The method according to claim 8, further comprising displaying the mobile directory number, and network access point physical address information through caller ID if the public safety answering point is an E911 phase I configured public safety answering point.

13. The method according to claim 8, further comprising displaying the mobile directory number, network access point address information, and physical address location information associated with the GPS location information if the public safety answering point is an E911 phase II configured public safety answering point.

14. The method according to claim 8, further comprising communicating the GPS location information and mobile directory number information in separate data packets.

15. The method according to claim 8, further comprising communicating the network access point physical address location information in type II caller ID format after the public safety answering point goes off-hook.

16. The method according to claim 8, wherein communicating the GPS location information and mobile directory information is performed using caller ID type-I while the public safety answering point is on-hook.

17. The system according to claim 1, wherein said controller is further configured to register WiFi access point identification information associated with each WiFi access point in a mesh network in which said controller and WiFi access point operates.

18. The system according to claim 1, wherein said gateway is further configured to communicate WiFi access point physical address information to the selective router.

19. The method according to claim 8, further comprising registering access point identification information associated with each WiFi access point in a mesh network in which said controller and WiFi access point operate.

20. The method according to claim 8, wherein receiving, at a network access point, an emergency 911 call signal includes receiving, at a WiFi network access point, an emergency 911 WiFi call signal.

* * * * *